United States Patent [19]

Karato

[11] 3,745,237

[45] July 10, 1973

[54] COLOR TELEVISION CAMERA EQUIPMENT HAVING A REFERENCE FILTER AND A COLOR FILTER ASSEMBLY INTERPOSED BETWEEN THE CAMERA AND SUBJECT

[75] Inventor: Yoshiteru Karato, Tokyo, Japan

[73] Assignee: Shiba Electric Co., Ltd., Tokyo, Japan

[22] Filed: Nov. 20, 1970

[21] Appl. No.: 91,470

[30] Foreign Application Priority Data

Nov. 22, 1969 Japan ............................... 44/93339

[52] U.S. Cl. ........................ 178/5.4 ST, 350/162 SF

[51] Int. Cl. ............................................. H04n 9/06

[58] Field of Search .................... 178/5.4 ST, 5.4 R; 350/162 SF

[56] References Cited

UNITED STATES PATENTS

| | | | |
|---|---|---|---|
| 3,015,689 | 1/1962 | Hirsch | 178/5.4 ST |
| 3,566,018 | 2/1971 | Macovski | 178/5.4 ST |
| 2,710,309 | 6/1955 | Antranikian | 178/5.4 ST |
| 3,510,575 | 5/1970 | Dillenburger et al. | 178/5.4 ST |
| 3,300,580 | 1/1967 | Jakagr et al. | 178/5.4 ST |
| 2,907,818 | 10/1959 | Jeer | 178/5.4 ST |
| 2,827,512 | 3/1958 | Stahl et al. | 178/5.4 ST |

*Primary Examiner*—Robert L. Griffin
*Assistant Examiner*—George G. Stellar
*Attorney*—Chittick, Pfund, Birch, Samuels & Gauthier

[57] ABSTRACT

A striped color filter assembly comprising at least two different color filter stripes at least one of which may prevent the transmission of at least one colored light and which are arrayed so as to be out of phase with each other by ¼ pitch is used in combination with a striped filter for generating a reference frequency. Both of the striped filters are interposed between an image tube of the camera and a subject to be televised.

9 Claims, 15 Drawing Figures

*INVENTOR.*
YOSHITERU KARATO
BY Chittick, Pfund, Birch, Samuels, + Gauthier
ATTORNEYS

INVENTOR.
YOSHITERU KARATO

BY Chittick, Pfund, Birch, Samuels, + Gauthier
ATTORNEYS

INVENTOR.
YOSHITERU KARATO

BY Chittick, Pfund, Birch, Samuels, + Gauthier

ATTORNEYS

COLOR TELEVISION CAMERA EQUIPMENT HAVING A REFERENCE FILTER AND A COLOR FILTER ASSEMBLY INTERPOSED BETWEEN THE CAMERA AND SUBJECT

BACKGROUND OF THE INVENTION

The present invention relates generally to a color television camera equipment and more particularly a color television camera equipment of the type in which a plurality of color signal components may be derived from a single image tube.

In general the conventional color television camera equipment separates into three primary color component parts the optical image picked up by the camera equipment and converts these into the electrical signals by three image tubes through filters each adapted to transmit only one primary color so that the conventional color television camera equipment is inevitably large in size, heavy in weight and complex in mechanism and circuitry.

SUMMARY OF THE INVENTION

The primary object of the present invention is therefore to provide an improved color television camera equipment.

Another object of the present invention is to provide an improved color television camera capable of deriving a plurality of color signals from a single image tube.

Another object of the present invention is to provide an improved color television camera equipment capable of deriving a plurality of color signals from an optical image of a subject to be televised by a single image tube.

In brief the present invention provides an improved color television camera equipment characterized by comprising an image tube, a striped color filter assembly interposed in the optical path between the image tube and a subject to be televised, a bias light source and a striped filter interposed between the image tube and the subject for generating a reference frequency, the color filter stripes being arrayed alternately in out-of phase relation with each other by ¼ pitch and capable of preventing the transmission of the light energy falling into a region of at least one color, whereby the optical image of the subject may be separated into a plu-rality of colors and a plurality of color signal components may be derived from the single image tube.

The present invention will become more apparent from the following description of the preferred embodiments thereof in conjunction with the accompanying drawing.

DESCRIPTION OF THE PREFERRED EMBODIMENTS

Figure 1:
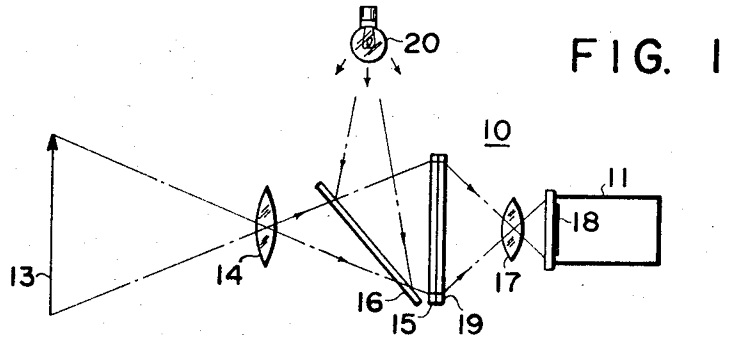
FIG. 1 is a diagrammatic view illustrating the fundamental construction of a color television camera equipment in accordance with the present invention.

FIG. 1 is a diagrammatic view illustrating the fundamental construction of a color television camera equipment in accordance with the present invention. The optical section of the television camera generally designated by 10 includes an image tube 11, a camera lens 14, a striped color filter assembly 15 to be described in more detail hereinafter, a half-mirror 16, a relay lens 17, a striped filter 19 for generating a reference frequency and a bias light source 20. The stripped filter 19 is made in contact with the striped color filter 15. Both of the filters 15 and 19 are interposed in the optical path between the image tube 11 and a subject 13 to be televised and focused upon a photoconductive faceplate 18 of the image tube 11.

Figure 2:
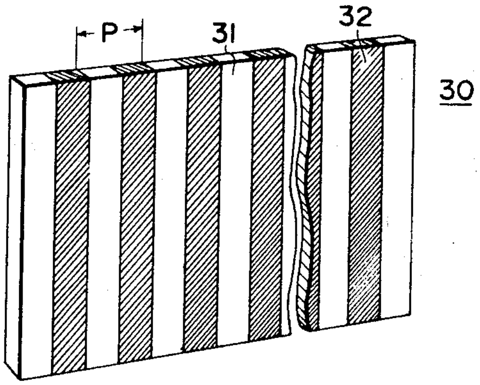
FIG. 2 is a fragmentary perspective view illustrating the fundamental construction of a striped color filter element used in the present invention.

FIG. 2 illustrates a striped color filter element 30 constituting the striped color filter assembly 15. The color filter element 30 comprises two kinds of color filter strips or stripes 31 and 32 alternately arrayed upon the same plane. These color filter stripes 31 and 32 have the different color light absorption characteristics. For example the color filter strip 31 may transmit therethrough all of the light energy in the spectrum of the incident light from the subject 13 while the strip 32 may transmit all of the light energy except that of a predetermined wavelength. The determination of pitch P, that is the sum of the widths of the two adjacent strips 31 and 32 will be described in more detail hereinafter.

Figure 3A:
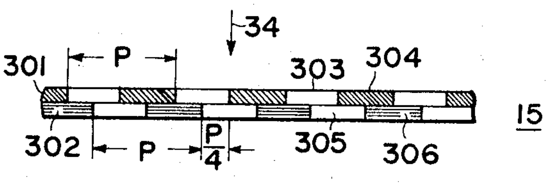
FIG. 3A is a fragmentary top view of a striped color filter assembly used in the color television camera equipment shown in FIG. 1.

FIG. 3A illustrates the striped color filter assembly 15 comprising two striped color filter elements 30 of the type described. The first and second color filter elements 301 and 302 are overlaid upon each other as shown so that the color filter strips may be oriented in the same direction. Both of the color filter elements 301 and 302 have the same pitch P and are so arranged as to be displaced or out of phase relative to the other by ¼ pitch as viewed from FIG. 3-A.

When the white light is made incident upon the color filter assembly 15 from the direction indicated by the arrow 34, the transmitted color signal components are illustrated in FIGS. 3B–3E. In this case, it is assumed that the color filter strips 303 of the first color filter element 301 transmit all of the light energy, that is all of the colors while the strips 304 prevent the transmission of red light. The strips 305 of the second color filter element 302 transmit all of the light energy, that is all of the colors while the filter strips 306 serve to prevent the transmission of blue light.

Figure 3B:
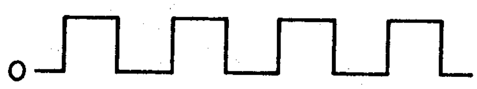
FIGS. 3B, 3C, 3D and 3E are graphs illustrating the individual color signal components and the synthesized color component when the white light is incident upon the striped color filter assembly shown in FIG. 3A.
Figure 3C:
Figure 3D:
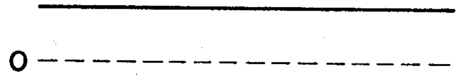

In consequence, the white light is separated into the color signal components as shown in FIGS. 3B, 3C and 3D. More particularly FIG. 3B illustrates the red color component impinging upon the faceplate of the image tube 11; FIG. 3C, the blue color component; and FIG. 3D, the green color component. From these figures, it is seen that both of the red and blue color components may be sampled at an interval of the pitch P and are out of phase by ¼ pitch, which is the most important feature of the present invention as will be described in more detail hereinafter.

Figure 4A:
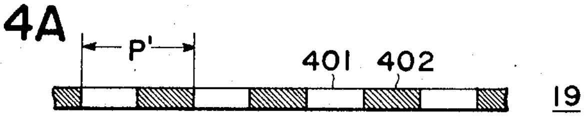
FIG. 4A is a top view of a striped filter for generating a reference frequency used in the color television camera equipment shown in FIG. 1.

FIG. 4A illustrates the striped filter 19 for generating the reference frequency comprising filter strips 401 and 402 both of which are alternately arrayed upon the same plane and have different absorption characteristics with respect to the bias light from the bias light source 20. For example, the filter strips 401 transmit all of the light energy while the filter strips 402 prevent the transmission of all of the light energy. In this case, the incident bias light may be transmitted as shwon in FIG. 4B. The pitch P' of the striped light filter 19 may be arbitarily selected independent of the pitch P of the color filter assembly 15.

The color of the bias light source 20 may be also arbitarily selected. It may be white light or any other color light as far as the light from the bias light source 20 incident upon the faceplate 18 of the image tube 11 may be varied by the filter 19.

Figure 5:
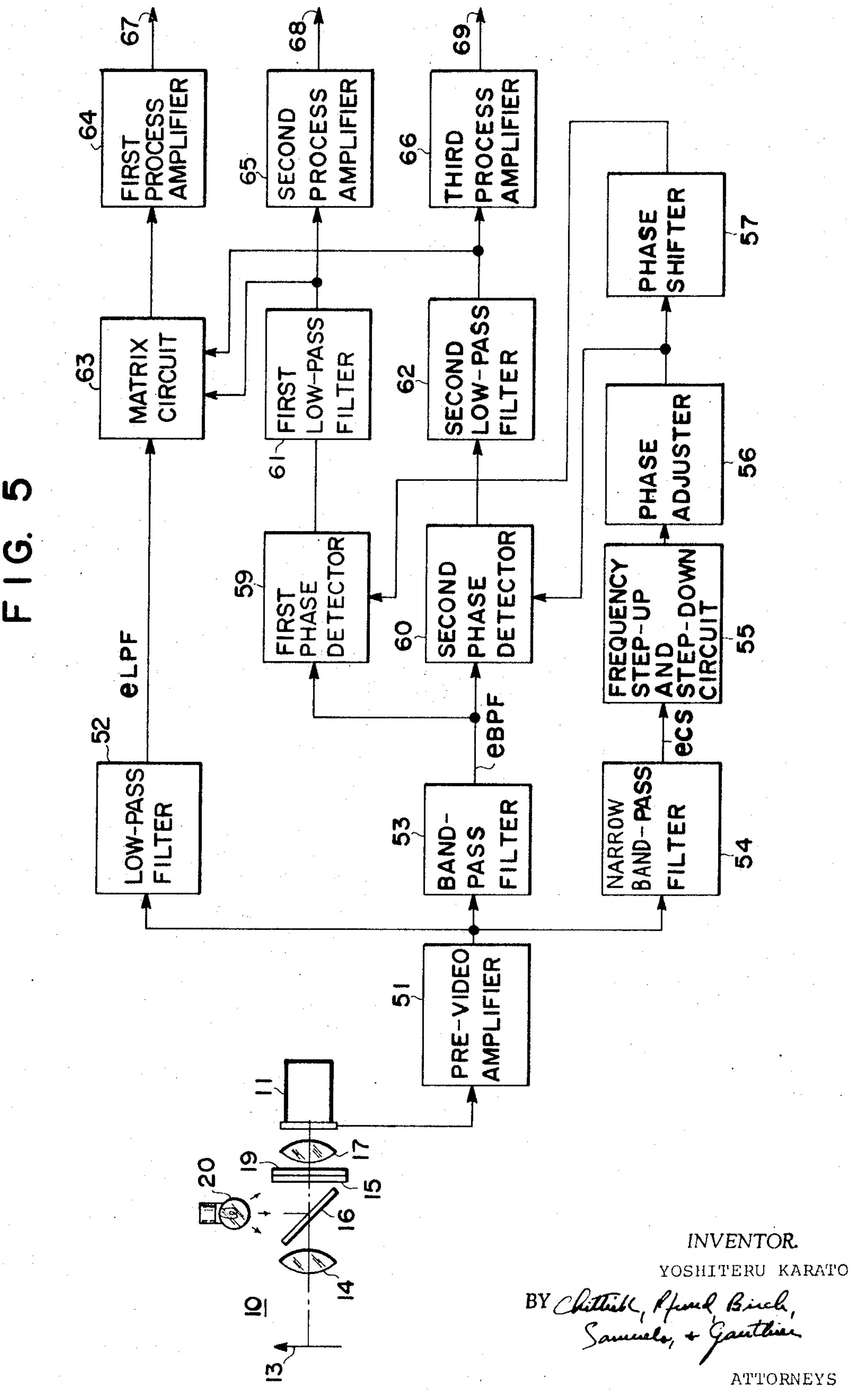
FIG. 5 is a block diagram of the color television camera equipment including the optical section shown in FIG. 1 and the associated circuitry.

FIG. 5 illustrates the optical system shown in FIG. 1 and the associated circuitly constituting the color television camera in accordance with the present invention. Reference numeral 51 designates a pre-video-amplifier for amplifying the video signal from the image tube 11 to a predetermined level; 52, a low-pass filter for deriving the direct video signal component from the output of the pre-video-amplifier 51; 53, a band-pass filter for deriving modulated signal component from the output of the image tube 11; 54, a narrow band pass filter for deriving the reference frequency $f_c$ from the output of the pre-video-amplifier 51; 55, a frequency step-up and step-down circuit for deriving the carrier frequency $f_o$ from the reference frequency $f_c$ from the narrow-band filter 54 ; 56, a phase adjuster for adjusting the phase of the carrier $f_o$ of the output of the circuit 55 so that the modulated signal may be phase-detected; and 57, a phase shifter for shifting the phase of the carrier with the frequency of $f_o$ by 90°. This phase shifter 57 is required for phase-detecting and shifting the phase angle because the red color signal carrier is out of phase by 90° relative to the blue color carrier.

Reference numeral 59 designates a first phase detector for demodulating the red color signal from both of the outputs from the band-pass filter 53 and the phase-shifter 57 ; 60, a second phase detector for demodulating the blue color signal from both of the outputs from the band-pass filter 53 and the phase adjuster 56; 61 and 62, a first and second low-pass filters for removing the harmonics and the carriers from the outputs of the first and second phase detectors 59 and 60 respectively so as to derive only the required signal components; 63, a matrix circuit for receiving the outputs from the first and second low-pass filters 61 and 62 so as to remove the blue and red color signal components out of the output from the low-pass filter 52; and 64, 65 and 66, a first, second and third process amplifiers respectively. The output of the matrix circuit 63 is fed into the first process amplifier 64; the output of the first low-pass filter 61, to the second process amplifier; and the output of the second low-pass filter 62 to the third process amplifier. These process amplifiers 64, 65 and 66 have the functions of establishing the black level relative to the green, red and blue signals, inserting the blanking signal, accomplishing the gamma correction and so on, and their outputs are applied to the exterior circuit through the lines 67, 68 and 69 respectively.

Figure 3E:
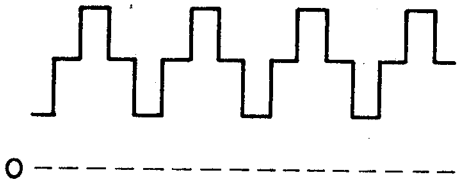

The subject 13 is focused upon the striped color filter assembly 15 through the half-mirror 16 by the camera lens 14. The light image projected upon the striped color filter assembly 15 is separated into colors and refocused upon the faceplate 18 of the image tube 11 through the reference frequency generating filter 19 and the relay lens 17. The light from the bias light source 20 is also projected upon the faceplate 18 of the image tube 11 through the half-mirror 16, the striped color filter assembly 15, the reference frequency generating filter 19 and the relay lens 17. That is, both of the images of the subject 13 and the reference frequency generating filter 19 are focused upon the faceplate 18 of the image tube 11 simultaneously so that the quantities or intensity of the two light images are superposed upon each other. The images upon the faceplate 18 of the image tube 11 may be scanned by scanning the electron beam at an angle relative to the longitudinal axis of each of the color filter strips of the striped color filter assembly 15. The output of the image tube 11 is illustrated in FIG. 3E wherein the time is plotted against the $x$-axis while the output voltage or output response against the $y$-axis. It should be noted that the output of the image tube 11 is the summation of the red, blue and green color signal components.

The output is pre-amplified by the pre-video-amplifier 51 to a predetermined level and then fed to the low-pass filter 52, the band-pass filter 53 and the narrow-band-pass filter 54, respectively. Only the reference frequency component is derived from the output of the prevideo-amplifier 51 through the narrow-band-pass filter 54 and is changed from the reference signal frequency to the carrier frequency $f_o$ in the frequency step-up and step-down circuit 55. The output is then applied to the phase adjuster 56 so that the signal is adjusted to have the phase required for phase detection. The output from the phase adjuster 56 is then applied to the first and second phase detecting circuits 59 and 60. Thpe signal to be applied to the first phase detecting circuit 59 is shifted by 90° by the phase shifter 57.

The band-pass filter 53 derives the modulated frequency component from the output of the pre-video-amplifier 51 and the modulated frequency component is fed into the first and second phase detectors 59 and 60 respectively for demodulations. In this case, the outputs from the phase shifter 57 and the phase adjuster 59 are utilized. The red color signal is derived from the first phase detector 59 while the blue color signal is derived from the second phase detector. These color signal components are transmitted on the lines 68 and 69 respectively through the second and third process amplifiers 65 and 66 after the harmonics and the carriers in the signal components are removed in the low-pass filters 61 and 62 respectively.

The direct signal component is directly derived from the output of the pre-video-amplifier 51 through the low-pass filter 52 and then fed into the matrix circuit 63 where the green color signal component may be derived directly from the video signal color component because the outputs from the first and second low-pass filters 61 and 62 are fed into the matrix circuit 63. The green color signal component is transmitted on the line 67 through the first process amplifier 64.

The red, blue and green color signal components may be represented by the output voltages in FIGS. 3B, 3C and 3D respectively.

According to the present invention by the combination of the stripped color filter assembly 15 with the reference frequency generating stripped filter 19, a plurality of color signal components (in the instant embodiment three color signal components) may be derived from a single image tube.

Next the underlying principle of the present invention will be analyzed hereinafter. Let it be assumed that each of the first and second striped color filter elements 301 and 302 in the color filter assembly 15 consists of a number of N pairs of first and second color filter strips; that the scanning time of the electron beam in the image tube 11 is T microseconds; and that the line blanking time is $t$ microseconds. Then the repetitive sampling frequency for sampling the red and blue color components is given by $$f_o = (N/T - t)\ MH_z \tag{1}$$

In Japan the standard electron beam scanning time T is 63.5 $\mu$s while the blanking time $t$ is about 10.8 $\mu$s.

When only the striped color filter assembly 15 is employed without the use of the reference frequency generating striped filter 19 and when the light from the subject 13 is the white color, the red color signal component $E_R$, the blue color signal component $E_B$ and the green color signal component $E_G$ may be given below $$E_R = \frac{1}{2} + \frac{z}{N} \sum_{n=0}^{\infty} \frac{1}{2n+1} \cos (2n+1)\omega o t \tag{2}$$

$$E_\beta = \frac{1}{2} + (-1)^n \frac{2}{N} \sum_{n=0}^{\infty} \frac{1}{2n+1} \sin (2n+1)\omega o t \tag{3}$$

$$E_G = 1 \tag{4}$$

where $W_o$ is the angular frequency of the repetitive sampling frequency $f_o$ given by $$W_o = Z\bar{N} f_o \tag{5}$$

As seen from FIGS. (2) - (4), the red color signal component and the blue color signal component produce the output signal from the image tube 11 consisting of the direct component, the fundamental wave (fundamental frequency $f_o$) and its odd harmonics. The red and blue color signal components are out of phase by 90°. The signal by the green color component consists only of the direct component.

When only the reference frequency generating striped filter 19 is employed without the use of the striped color filter assembly 15 and when the light from the subject 13 is the white color, the red, blue and green color signal components in the output from the image tube 11 are equal to $$E = 1 + \frac{z\Delta}{N} \sum_{m=0}^{\infty} \frac{1}{2m+1} \cos (2m+1)\omega c t \tag{6}$$

where $\omega_c$ is the angular frequency of the reference frequency $f_c$ and the reference frequency $f_c$ is determined by a number M of sets of elements constituting the striped filter 19 and the electron beam scanning time of the image tube 11 from Eq. (1).

Therefore when both of the color filter assembly 15 and the reference frequency generating filter 19 are used and when the light from the subject is the white color, the red, blue and green color signal components $E'_R$, $E'_B$ and $E'_G$ in the output of the image tube 11 are given below :

$$E'_R = \text{Eq. (2)} \times \text{Eq. (6)}$$

$$= \frac{1}{2} + \frac{2}{N} \sum_{n=0}^{\infty} \frac{1}{2n+1} \cos (2n+1)\omega o t$$

$$\frac{\Delta}{\pi} \sum_{m=0}^{\infty} \frac{1}{2m+1} \cos (2m+1)\omega c t$$

$$+ \frac{z\Delta}{N} \sum_{m=0}^{\infty} \sum_{n=0}^{\infty} m \frac{1}{2n+1} \cdot \frac{1}{2n+1} [\cos \{(2m+1)\omega_c$$

$$+ (2n+1)\omega_o)\}t + \cos \{(2n+1)\omega_c - (2n+1)\omega_o)\}t] \tag{7}$$

$$E'_B = \text{Eq. (3)} \times \text{Eq. (6)}$$

$$= \frac{1}{2} + (-1)^n \frac{2}{N} \sum_{n=0}^{\infty} \frac{1}{2n+1} \sin (2n+1)\omega o t$$

$$+ \frac{\Delta}{N} \sum_{m=0}^{\infty} \frac{1}{2m+1} \cos (2m+1)\omega_c t$$

$$+ (-1)^n \frac{2\Delta}{N^3} \sum_{m=0}^{\infty} \sum_{n=0}^{\infty} \frac{1}{2m+1} \cdot \frac{1}{2n+1}$$

$$[\sin \{(2m+1)\omega_c + (2n+1)\omega_o\}t \sin \{(2m+1)\omega_c - (2n+1)\omega_o\}t] \tag{8}$$

$$E'_G = \text{Eq. (4)} \times \text{Eq. (6)}$$

$$= 1 + \frac{Z\Delta}{N} \sum_{m=0}^{\infty} \frac{1}{Zm+1} \cos (2m+1)\omega_c t \tag{9}$$

In Eqs (7), (8) and (9) the first term of each equation is the component when the subject is directly focused by the image tube 11 without the use of the color filter assembly 15 and the reference signal generating filter 19. However, it should be noted that the output level of each of the red and blue color signal components is one half of that occurring when the subject is pictured without the use of the color filter assembly and the reference frequency generating filter.

The second terms of Eqs. (7) and (8) represent the component produced by use of the striped color filter assembly 15 when the red and blue color signal components are separated from the fundamental waves in accordance with the present invention as will be described in more detail hereinafter. The third terms in Eqs. (7) and (8) are those derived when the striped reference frequency generating filter 19 is used for demodulating the red and blue color signal components from the modulated signals of the red and bluw color signal components as will be described hereinafter. The fourth terms in Eqs. (7) and (8) are those derived wh en the light from the subject transmits through both the color filter assemblby 15 and the reference frequency generating filter 19 and which are not required as the color television signal. The second and third terms in Eqs. (7) and (8) include the harmonics consisting only of the odd harmonics. For example, the third harmonic has a level decreased to ⅓ and its frequency is increased by 3 times. Other higher harmonics have further decreased levels so that it is rather simple to eliminate these harmonics. The harmonic components in the fourth terms in Eqs. (7) and (8) have the low level of $(\frac{1}{2}m+1) \times (\frac{1}{2}n+1)$ and the frequency of the summation of $(2m+1)$ fc and $(2n+1)$ fo becomes higher so that they may be easily separated.

Therefore the problem is the undesired component of $(fc - fo)$ and it is necessary to reduce the value of $\Delta$ in FIG. 4A as much as possible. For example when $\Delta = 0.05$, and the transmission factor of the filter element 402 of the reference frequency generating filter 19 is reduced by 5 percent from that of the filter strip 401, the levels of the various frequency components are given in the Table below.

| | Color | | |
|---|---|---|---|
| Frequency component | Red | Blue | Green |
| Direct component | 0.5 | 0.5 | 1.0 |
| *fo* components | 0.64 | 0.64 | 0.0 |
| *fc* component | 0.016 | 0.016 | 0.032 |
| (*fc* – *fo*) component | 0.01 | 0.01 | 0.00 |

From this Table it is seen that the level of the undesired signal component $(fc - fo)$ is of the order of 1/50 to 1/100 of the levels of other frequency components and will not present any problem in practice. Therefore the necessary signal components in Eqs. (7) – (9) are given below:

$$E'_R \cong \tfrac{1}{2} + 2/90 \cos \omega o A + \Delta/\pi \cos \omega c t \qquad (10)$$

$$E'_B \cong \tfrac{1}{2} + 2/\pi \sin \omega o A + \pi \cos \omega c t \qquad (11)$$

$$E'_G \cong 1 + 2\Delta/\pi \cos \omega c t \qquad (12)$$

So far the light from the subject to be televised has been assumed as white light, but in general the light from the subject is not the white light so that the color signal components are varied in accordance with the color of the subject. Thus the red, blue and green color signal components $L_R$,$L_B$ and $L_G$ of the general reflected color light from the subject synthesized by the white bias light from the bias light source 20 may be given below:

$$L_R = A_R + L + B_R \cos \Omega_R t \qquad (13)$$

$$L_B = A_B + L + B_B \cos \Omega_B t \qquad (14)$$

$$L_G = A_G + L + B_G \cos \Omega_G t \qquad 15)$$

where $A_R$, $A_B$ and $A_G$: DC componets of red, blue and green color signal in the light from the subject;

$L$: the component from the bias light source 20;

$B_R$, $B_B$ and $B_g$: peak values of the Ac components in the light from the subject; and $\Omega_R$, $\Omega_B$ and $\Omega_G$: maximum angular frequencies of the highest frequencies of the red, blue and green color signal components in the light from the subject.

When the light from the subject 13 consisting of the color signal components given by Eqs. (13) – (15) is intercepted by the image tube 11, the red, blue and green color signals $e_R e_B$ and $e_G$ in the signal derived from the signal electrode of the image tube 11 may be given below:

$$e_R = (13) \times (10) = \tfrac{1}{2} (A_R + L + B_R \cos \Omega R\ t) + 2/\pi (A_R + L + B_R \cos \Omega r\ t) \cos \Omega o\ t + \Delta/\pi (A_R + L) \cos \omega e\ t + B_R\ \Delta/\pi \cos \Omega R\ t \cos \omega o\ t \qquad (16)$$

$$e_B = (14) \times (11) = \tfrac{1}{2} (A_B + L + B_B \cos \Omega_B t) + 2/\pi (A_B + L + B_B \cos \Omega B\ t) \sin \omega o\ t + \Delta/\pi (A_B + L) \cos \omega c\ t + B_B\ \Delta/\pi \cos \Omega_B t \cos \omega c\ t \qquad (17)$$

$$e_G = (15) \times (12) = (A_G + L + B_G \cos \Omega_G t) + 2\Delta/\pi (A_G + L) \cos \omega c t + B_G\ 2\Delta/\pi \cos \Omega_G t \cdot \cos \omega c\ t \qquad (18)$$

Therefore the output form the image tube 11 including these color signal components is fed into the low-pass filter 52 through the pre-video-amplifier 51, only the first terms of Eqs. (16) – (18) are drived. In this case, the signal $e_{LPF}$ derived from the low-pass filter 52 is given below:

$$e_{LPF} = \tfrac{1}{2} (A_R + B_R \cos \Omega r\ t) + \tfrac{1}{2} (A_B + B_B \cos \Omega_B t) + (A_G + B_G \cos \Omega_G t) + 2L \qquad (19)$$

From Eq. (19) it is seen that the output of the low-pass filter 52 consists of the red, blue and green color signal components of the light from the subject 13 and the component of the bias light source 20.

When the output of the image tube 11 is fed into the band-pass filter 53 through the pre-video-amplifier 51, the output of the band-pass filter has a bandwidth centered around the frequency fo. The band-pass filter 53 passes the red and blue color signal components ($fo \pm \Omega_R, \Omega_B$ but prevents all of other frequency components. Therefore the output $e_{BPF}$ of the band-pass filter 53 may be given below:

$$e_{BPF} = 2/\pi \{ (A_R + L + B_R \cos \Omega_R t) \cos \omega o\ t + (A_B + L + B_B \cos \Omega_B t) \sin \omega o\ t \} \qquad (20)$$

From Eq. (20) it is seen that the signal $e_{BPF}$ derived from the band-pass filter 53 consists of the quadrant phase modulated signals whose carrier is the frequency fo and whose modulating frequencies are the red and blue color signal components of the light from the subject 13.

Therefore when the signal represented by Eq. (20) is phase-detected by the first and second phase detector 59 and 60, the red and blue color signals may be drived independently.

When the output $e_{LPF}$ of the low pass filter 52 is fed into the matrix circuit 63, the green color signal component may be derived independently. More specifically in addition to the output $e_{LPF}$ of the low-pass filter 52, the red and blue color signal component outputs from the first and second low-pass filters 61 and 62 are applied to the matrix circuit 63 as subtraction elements so that in Eq. (19) and red and blue color signal components are substracted, thereby leaving only the green signal color component.

Next the carrier frequency fo required for phase-detection of the signal represented by Eq. (20) will be discussed hereinafter. When the output of the image tube 11 is fed into the narrow band-pass filter 54 through the pre-video-amplifier, the output $e_{CS}$ of the narrow band-pass filter 54 is given below:

$$e_{CS} = \Delta/\pi (A_R + A_B + 2A_G + 4L) \cos \omega c\ t \qquad (21)$$

In this case the frequency $fc$ of the angular frequency $\omega c$ is determined by the number M of sets of filter elements of the filter 19 and the scanning time of the electron beam for scanning the image of the filter 19 upon the faceplate of the image tube 11. In the present invention, the frequency fc is given by $$fc = n/m\ fo$$

where *n:* a positive integer determined depending upon the image tube used and the video signal bandwidth.

Therefore the output of the narrow band-pass filter 54 represented by Eq. (21) is stepped up by m times and is stepped down by 1/n in order to obtain the frequency fo.

Figure 6:
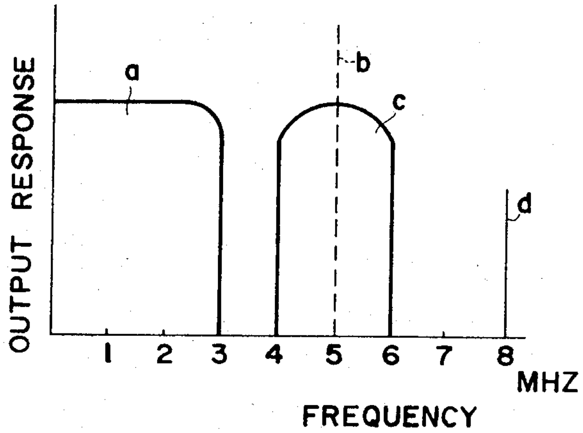
FIG. 6 is a graph of a typical frequency vs. output response curve of the color television camera equipment in accordance with the present invention.

FIG. 6 showns the typical frequency versus output response curves of the color television camera in accordance with the present invention. The curve *a* indicates the signal component represented by Eq. (13) and has the bandwidth of 3 $MH_z$ in this embodiment. The broken line *b* indicates the carrier frequency fo (5$MH_z$ in the instant embodiment) represented by Eq. (20). The area *c* indicates the signal component represented by Eq. (20) and has a bandwidth of 1 $MH_z$. The line *d* indicates the fundamental frequency *fc* in Eq. (12) which is 8/5 *fo*, 8 $MH_z$ in the instant embodiment.

Figure 7A:
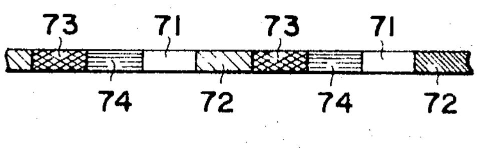
FIGS. 7A and 7B are fragmentary top views of two variations of the striped color filter assembly.
Figure 7B:
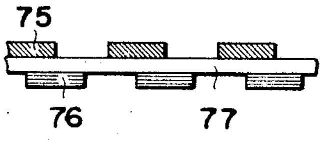

FIGS. 7A and 7B illustrate variations of the striped color filter assembly in accordance with the present invention. The variation may attain the same function as the filter assembly 15 shown in FIG. 3. Four types of color filter strips 71, 72, 73 and 74 are arrayed on the same plane and the color strip 71 may transmit all of the light energy; the strip 72 prevents the transmission of the red light; the strip 73 transmits only the green light; and the strip 74, prevents transmission of the blue light.

FIG. 7B illustrates another variation of the striped color filter assembly in which color filter strips 75 and 76 are overlaid on both sides of the transparent base plate 77 in out of phase relation with each other by a ¼ pitch as shown.

Figure 8:
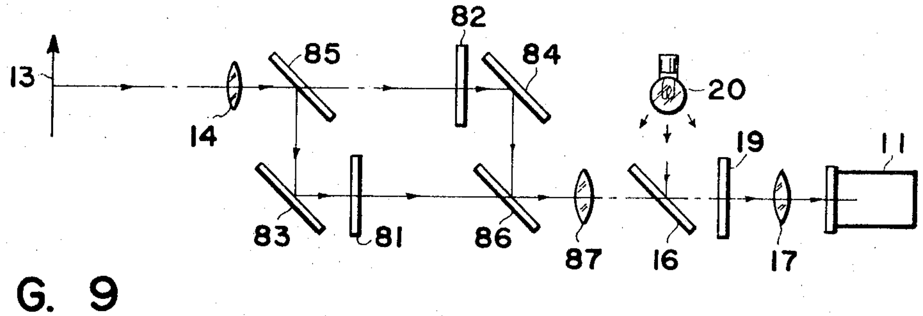
FIGS. 8 and 9 are diagrammatic views illustrating second and third embodiments of the present invention respectively.

FIG. 8 is a diagrammatic view illustrating another embodiment of the present invention in which the combination of the image tube 11 with the striped color filters is different from the first embodiment described hereinabove. The component parts identical to those in FIG. 1 are designated by the same reference numerals. Reference numerals 81 and 82 designate first and second striped color filters the combination of which corresponds to the striped color filter assembly 15 of the first embodiment shown in FIG. 1 ; 83 and 84, reflecting mirrors; 85 and 86, half-mirrors; and 87, a relay lens. The first and second striped color filters 81 and 82 are disposed in different optical paths. The light passed through the camera lens 14 from the subject 13 is split into two beams by means of the half-mirror 85. One of the split beams is redirected by the reflecting mirror 83 so as to be focused upon the first striped color filter 81 while the other split beam is focused upon the second striped color filter 82. The image upon the first color filter 81 is further focused upon the faceplate 18 of the image tube 11 through the two- half-mirror 86 and 16, the relay lens 87, the striped filter 19 and the relay lens 17. The image focused upon the second color filter 82 is redirected by the reflecting mirror 84 and superposed upon the image from the first color filter 81 upon the half-mirror 86. The light from the bias light 20 is transmitted to the refernce frequency generating filter 19 interposed between the subject 13 and the image tube 11 through the half-mirror 16 and the image of the reference frequency generating filter 19 is focused upon the faceplate 18 of the image tube 11 by the relay lens 17.

The first color filter 81 has the same construction with that of the first color filter element 301 of the color filter assembly 15 shown in FIG. 3A and comprises the color filter strips which are adapted to transmit all of the light energy and the color filter strips which may prevent the transmission of the red light. The second color filter 82 has the same construction with that of the second color filter element 302 of the color filter assembly 15 shown in FIG. 1 and comprises the color filter strips which may transmit all of the light energy and the second color strips which may prevent the transmission of the blue light. When the images of the color filter strips of the filter 81 are focused upon the faceplate 18 of the image tube 11 with the same pitch as that of the images of the filter 82 but out of phase by ¼ pitch as in the case of the color filter assembly 15 a result similar to that in the first embodiment will be attained. In the second embodiment it should be noted that the actual dimensions and pitches of the color filters 81 and 82 may be different from each other as long as the pitches of the images focused upon the faceplate 18 of the image tube 11 are made equal. In other words, the striped color filters having the different pitches may be utilized if the pitches of the color filters 81 and 82 focused upon the faceplate 18 of the image are made equal optically.

Figure 4B:
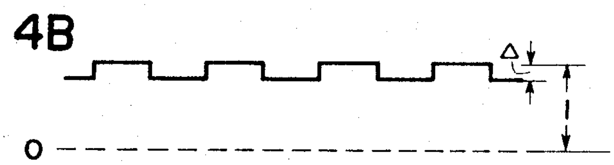
FIG. 4B is a graph illustrating the light signal component obtained when the striped filter shown in FIG. 4A is used.

The arrangement of the reference frequency generating filter 19 and the bias light source 20 is same with that of the first embodiment described with reference to FIGS. 1, 4A and 4B so that no further description will be made.

Figure 9:
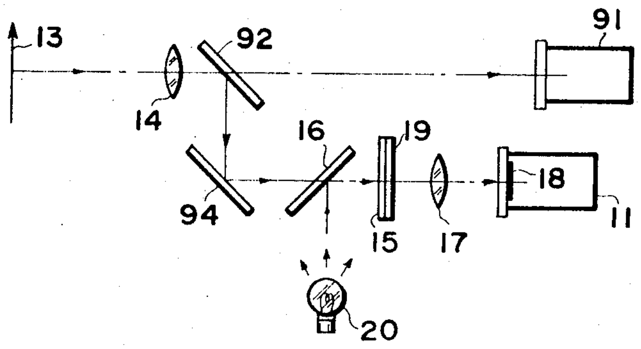

FIG. 9 illustrates the third embodiment of the present invention applied to a color television camera employing a picture brightness or luminance signal separation system. The same component parts as those in the first embodiment shown in FIG. 1 are designated by same reference numerals. Reference numeral 91 designates an image tube for deriving the luminance signal; 92, a half-mirror; and 94, a reflecting mirror. The light beam from the subject 13 through the camera lens 14 is split into two beams by the half-mirror 92. One of the split beams is directed to the image tube 91 while the other split beam is directed to the striped color filter assembly 15 through the reflecting mirror 94 and the half-mirror 16. The image focused upon the color filter assembly 15 is focused again upon the faceplate 18 of the image tube 11 through the filter 19 and the relay lens 17. The light from the bias light source 20 is focused upon the faceplate 18 of the image tube 11 through the half-mirror 16, the striped color filter assembly 15, the reference frequency generating filter 19 and the relay lens 17.

Thus the high quality video signal is derived from the image tube 11 while the high quality brightness or luminance signal from the image tube 91.

In the instant embodiment instead of the half-mirror 92 dichroic mirrors may be employed. A dichroic mirror may reflect the color for which it is made and pass all other colors through it. When the mirror 92 is made to pass only the green color light, the red and blue color signal components may be derived from the image tube 11 while the green color signal component is derived from the image tube 91. It is therefore seen that the video signal output from the image tube 91 is the high quality output which may be advantageously used in the simplified luminance separation system.

What is claimed is:

1. A color television camera equipment characterized by comprising an image tube, a striped color filter assembly interposed between a subject to be televised and said image tube, a bias light source, and a striped filter containing filter strips of different light transmission factors, separate from said striped color filter assembly, and interposed in the optical paths between said image tube and said subject and between said image tube and said bias light source for generating a reference frequency, said striped color filter assembly including at least two filter strips, each of which prevents the transmission of at least one color of light from the light from said subject, said strips preventing the transmission of different colors of light and being of substantially equal widths, said two strips being disposed so that their images focused on said image tube are out of phase with respect to each other by ¼ pitch, said striped filter and striped color filter assembly being disposed so that the images of at least some of their strips focused on said image tube at least partly coincide.

2. A color television camera equipment as specified in claim 1 wherein said striped color filter assembly comprises first and second striped color filter elements, said first color filter element comprising a plurality of alternately arrayed first and second color filter strips, said first color filter strips being capable of transmitting all of the light energy from said subject while said second color strips being capable of preventing the transmission of light energy falling into the range of at least one first color, said second color filter element comprising a plurality of alternately arrayed third and fourth color strips, said third color strips being capable of transmitting all of the light energy from said subject while said fourth color filter strips being capable of preventing the transmission of the light energy falling into the range of a color different from said first color, said strips of said first and second striped color filter elements being of substantially equal widths and said first and second striped color filter elements being disposed so that stripe images of said filter elements focused on said image tube are out of phase by ¼ pitch relative to each other.

3. A color television camera equipment as specified in claim 2 wherein said first striped color filter element is disposed in contact with said second striped color filter element, and both of said first and second striped color filter elements have the same strip pitch.

4. A color television camera equipment as specified in claim 2 wherein said first and second striped color filter elements are disposed in different optical paths, and including means for focusing light from said first and second striped color filter elements upon said image tube, so that the images of said first and second striped color filter elements on said tube have the same strip pitch and are out of phase by ¼ pitch relative to each other.

5. A color television camera equipment as specified in claim 1 wherein said striped color filter assembly comprises a striped color filter element consisting of alternately arrayed four types of color filter strips on the same plane, the first of said four types of color filter strips being capable of transmitting all of the light energy of the spectrum from said subject, the second capable of preventing the transmission of red light, the third capable of transmitting only green light and the fourth capable of preventing the transmission of blue light.

6. A color television camera equipment as specified in claim 1 wherein said striped color filter assembly comprises a transparent base plate, a plurality of first color filter strips disposed on one surface of said transparent base plate in equidistant spaced apart relation with each other, said first color filter strips being capable of preventing the transmission of light energy falling into a range of at least one first color, and a plurality of second color filter strips disposed on the other surface of said transparent base plate in equidistant spaced apart relation with each other, but in out-of-phase relation with said first color filter strips by ¼ pitch, said second color filter strips being capable of preventing the transmission of the light energy falling into a range of a color different from said first color.

7. A color television camera equipment as specified in claim 1 wherein said striped filter for generating a reference frequency comprises a plurality of first and second filter strips which are alternately arrayed and have different light transmission factors.

8. A color television camera equipment as specified in claim 1 further comprising a low-pass filter for deriving the direct video signal component from the output signal of said image tube, a band-pass filter for deriving the modulated signal component from the output signal of said image tube, a narrow-band-pass filter for deriving the reference frequency from the output signal of said image tube, means for generating a carrier frequency in response to the output of said narrow-band-pass filter, and means for demodulating the light from said subject in response to the output of said generating means by processing the outputs from both of said low-pass and band-pass filters.

9. A color television camera equipment as specified in claim 8 wherein said demodulating means comprises first and second phase detectors for phase detecting the output of said band-pass filter, means for supplying said carrier frequency to said second phase detector, a phase shifter for shifting the output of said supply means by 90° and having its output connected to said first phase detector, and a matrix circuit to which is fed the outputs from said low-pass filter and said first and second phase detectors, whereby the color signal components of light from said subject may be obtained from said first and second phase detectors and said matrix circuit respectively.

* * * * *